(12) United States Patent
Perticara'

(10) Patent No.: US 8,612,991 B2
(45) Date of Patent: Dec. 17, 2013

(54) DYNAMIC CRITICAL-PATH RECALCULATION FACILITY

(75) Inventor: Valeria Perticara', Rome (IT)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 12/276,909

(22) Filed: Nov. 24, 2008

(65) Prior Publication Data

US 2009/0158294 A1 Jun. 18, 2009

(30) Foreign Application Priority Data

Dec. 18, 2007 (EP) .................................... 07301699

(51) Int. Cl.
*G06F 9/46* (2006.01)

(52) U.S. Cl.
USPC .......................................................... 718/106

(58) Field of Classification Search
None
See application file for complete search history.

(56) References Cited

U.S. PATENT DOCUMENTS

| 5,101,340 A | 3/1992 | Nonaka et al. |
| 5,408,663 A * | 4/1995 | Miller ............................ 718/104 |
| 5,671,361 A | 9/1997 | Brown et al. |
| 5,826,080 A * | 10/1998 | Dworzecki .................... 718/103 |
| 5,893,905 A | 4/1999 | Main et al. |
| 6,571,215 B1 * | 5/2003 | Mahapatro .................... 705/7.12 |
| 6,665,716 B1 | 12/2003 | Hirata et al. |
| 7,230,736 B2 | 6/2007 | Fromherz |
| 2003/0149717 A1 * | 8/2003 | Heinzman ...................... 709/101 |
| 2003/0208470 A1 | 11/2003 | MacLellan et al. |
| 2005/0275875 A1 | 12/2005 | Jennings, Jr. |
| 2006/0288346 A1 * | 12/2006 | Santos et al. ................... 718/102 |
| 2008/0010642 A1 | 1/2008 | MacLellan et al. |
| 2008/0027776 A1 * | 1/2008 | Sourov et al. ...................... 705/8 |

* cited by examiner

*Primary Examiner* — Emerson Puente
*Assistant Examiner* — Sisley Kim
(74) *Attorney, Agent, or Firm* — Nelson and Nelson; Daniel P. Nelson; Alexis V. Nelson

(57) ABSTRACT

A method for dynamically recalculating a critical path in a job scheduling system is disclosed. In selected embodiments, the method may include determining when a first job associated with a critical path is substantially complete. The method may further include identifying a successor job of the first job and identifying multiple predecessor jobs of the successor job. The method may then determine whether there is at least one predecessor job that has not completed. In the event there is at least one predecessor job that has not completed, the method may recalculate the critical path. A corresponding apparatus and computer program product for implementing the above-stated method are also disclosed.

9 Claims, 3 Drawing Sheets

DYNAMIC CRITICAL-PATH RECALCULATION FACILITY

BACKGROUND

One issue that is important when scheduling batch jobs is guaranteeing that jobs are completed by an expected deadline. In particular, service level agreements may need to be met for specific jobs or groups of jobs. "Critical path analysis" may be used to analyze batch job dependencies to identify the most critical path to achieve an expected deadline. In general, critical path analysis may involve breaking a task (e.g., a sequence of jobs) into a series of related activities (e.g., jobs). The success or failure of the task depends on the management and scheduling of the activities. In particular, information on likely activity duration, cost, and logically necessary operations may be used to optimize the performance of the task.

For a given task, some activities may depend on others. In particular, some activities may only begin when other activities (known as predecessor activities or jobs) have been completed. Other activities may take place concurrently and a task may only be complete when all the activities have been completed. Some activities in the task may be critical. In such cases, if these activities are delayed, completion of the task may also be delayed. Similarly, other activities may be non-critical, meaning that they can be delayed some amount without delaying the entire task.

A scheduling product may need to monitor critical jobs and prioritize them and their predecessors in such a way that the deadlines for service level agreement jobs are satisfied. However, one significant problem in achieving this end is optimizing resource usage. For example, prioritizing all the predecessor jobs of a critical job would be tantamount to having no prioritization. Thus, it may be necessary to identify a subset of predecessor jobs to monitor and prioritize.

A critical path (i.e., a sequence of predecessor jobs that, if delayed, can cause delay of a dependent critical job) may be calculated statically before a work flow execution begins. In practice, a critical path may be calculated by starting from a critical job, and regressing backward through a chain of predecessor jobs. However, there are several conditions that may render a critical path invalid at execution time. For example, a "most critical predecessor" job may be determined by evaluating estimated data that may produce unrealistic results. For example, an estimated job duration may be calculated based on historical data, but a particular run of a job may be longer than usual. Similarly, a user may need to change a plan, for example, by reducing available resources or adding a new job. This could cause another predecessor job to be more critical than a job believed to be the most critical at planning time. Or there could simply be more than one path that is critical to complete a job.

SUMMARY

Embodiments of the invention relate to dynamically recalculating a critical path in a job scheduling system.

One embodiment of the invention includes a method for dynamically recalculating a critical path in a job scheduling system. In selected embodiments, the method may include determining when a first job associated with a critical path is substantially complete. The method may further include identifying a successor job of the first job and identifying multiple predecessor jobs of the successor job. The method may then determine whether there is at least one predecessor job that has not completed. In the event there is at least one predecessor job that has not completed, the method may recalculate the critical path.

A corresponding apparatus and computer program product for implementing the above-stated method are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which.

DETAILED DESCRIPTION OF THE INVENTION

Figure 1:
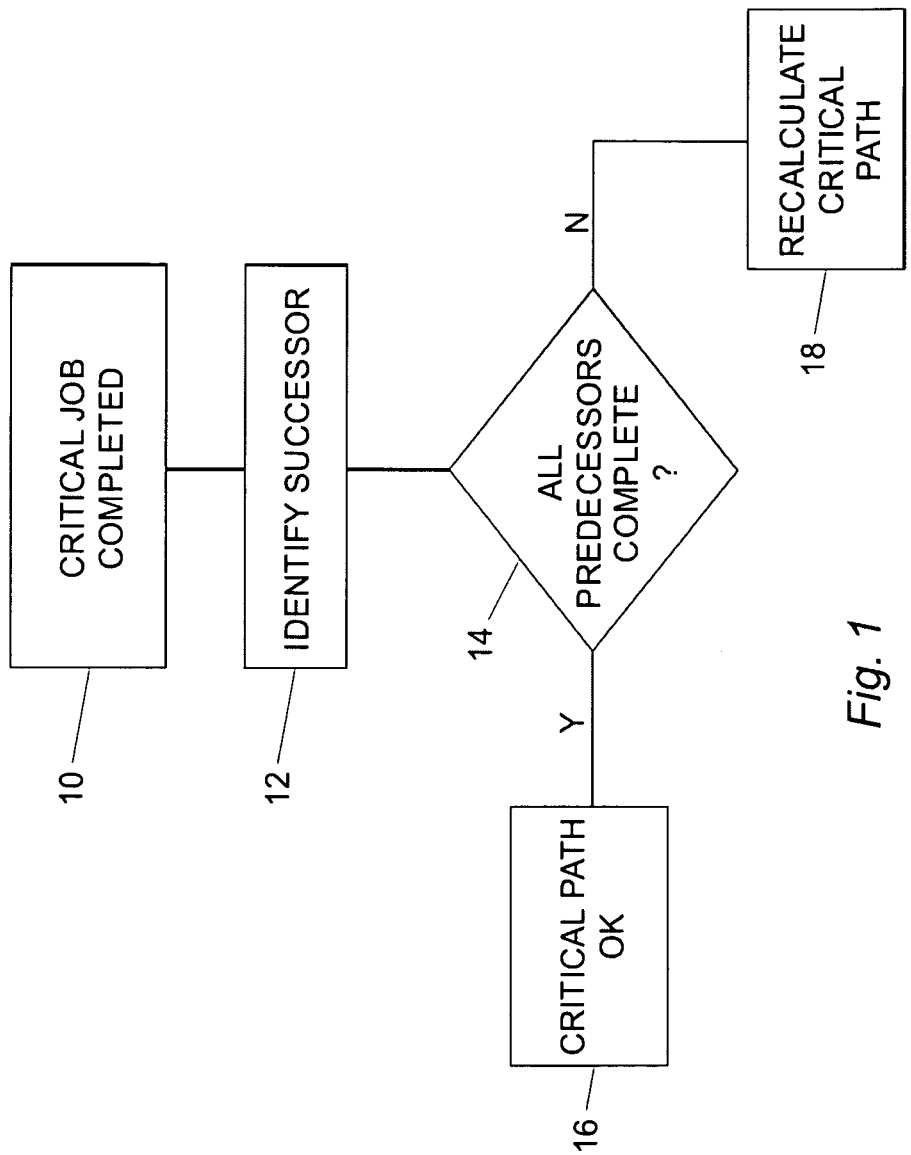
FIG. 1 is a flowchart of one embodiment of a method in accordance with the invention.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, in general, a method in accordance with the invention may, given a critical job, analyze a chain of predecessor jobs. Based on a set of criteria, the method may calculate a critical path, while recognizing that a job can belong to several critical paths.

Once a job on a critical path is complete 10, the method may identify 12 a successor job on the critical path. If the critical path calculation was correct, all predecessor jobs prior to the successor job should be complete. If the method determines 14 that all predecessor jobs of the successor job are complete, the critical path may be determined to be satisfactory. If, on the other hand, the method determines 14 that all predecessor jobs of the successor job are not complete, the method may recalculate 18 the critical path.

This method allows resource usage to be optimized since it takes into account the tree of predecessors for a critical job, while retaining the correct order of prioritization for the jobs. Similarly, the method may provide a computationally efficient mechanism (which adds a minimal computational burden on a job scheduling system) for dynamically recalculating a critical path, since only a small portion of the workflow is affected by the critical path recalculation, and because the recalculation only occurs when necessary.

Figure 2:
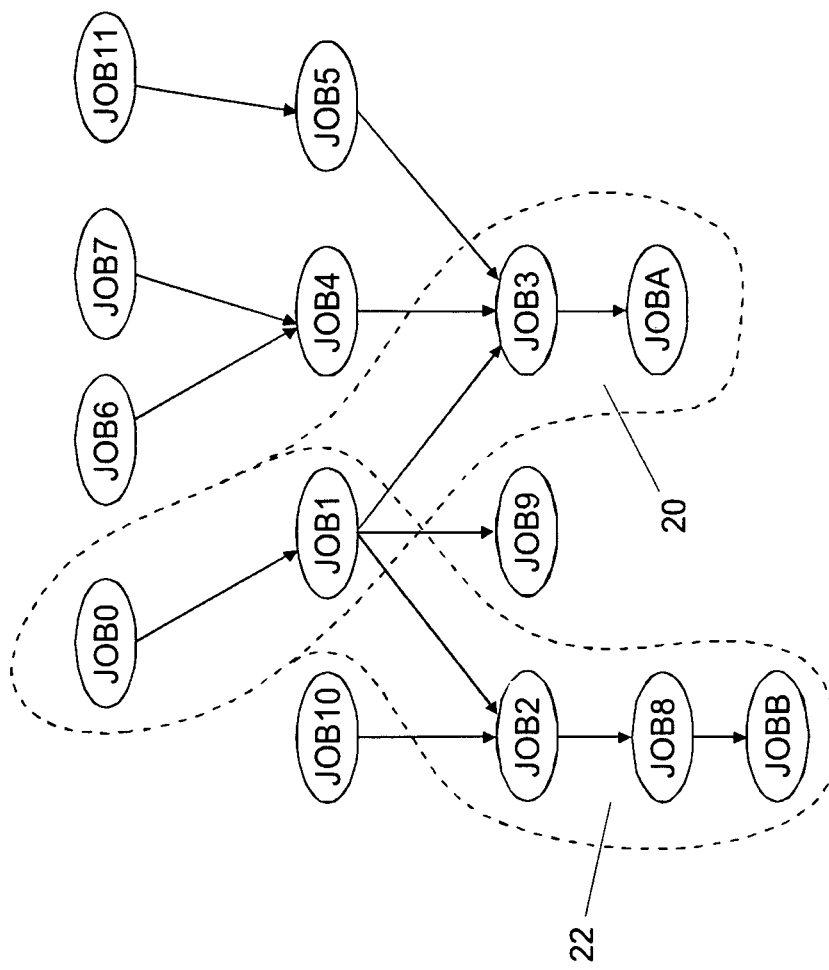
FIG. 2 is an activity tree showing the operation of one embodiment of a method in accordance with the invention.

Referring to FIG. 2, assume that JOBA and JOBB are two critical jobs. As determined in the planning stage of a project, assume that a critical path 20 for JOBA includes JOB3, JOB1, and JOB0. Furthermore, assume that a critical path 22 for JOBB includes JOB8, JOB2, JOB1, and JOB0. At a particular moment in time, assume that a job on one of the critical paths 20, 22 has completed. For the sake of example, assume that the job is JOB1. This job has a number of successors, namely JOB2, JOB9, and JOB3. JOB2 and JOB3 belong to two separate critical paths 20, 22. On critical path 22, assume that all the predecessors of JOB2, namely JOB1 and JOB10 have completed. According to the method described in FIG. 1, it is not necessary to recalculate the critical path 22. However, assume that for critical path 20, JOB3 has two uncompleted predecessors, namely JOB4 and JOB5. According to the method of FIG. 1, a standard critical path algorithm may be applied to JOB3 to recalculate the critical path 20 (by disregarding the completed predecessor JOB1).

The result of the critical path calculation for JOB3 will differ from the original calculated critical path 20 because the completed job JOB1 will no longer be considered in calculating the critical path. Accordingly, there may be two potential new critical paths for JOBA. The first critical path may include JOB7, JOB4, JOB3, and JOBA (assuming that JOB6 is already complete and thus not considered in calculating the first critical path). The second critical path may include JOB5, JOB3, and JOBA (assuming that JOB11 is already complete and thus not considered in calculating the second critical path).

It should be understood that the more accurate the original critical path calculation, the less recalculations of the critical path that will be needed. This is because if the predecessor jobs that are considered to be most critical during the planning phase are completed, all other predecessor jobs will typically already be completed. By limiting the critical path recalculation to the above condition, the recalculation process is less computationally demanding. This, in turn, enables the performance of the overall system to be retained. Furthermore, the method may enable all of the predecessors to be taken into account, but with the correct prioritizations.

Figure 3:
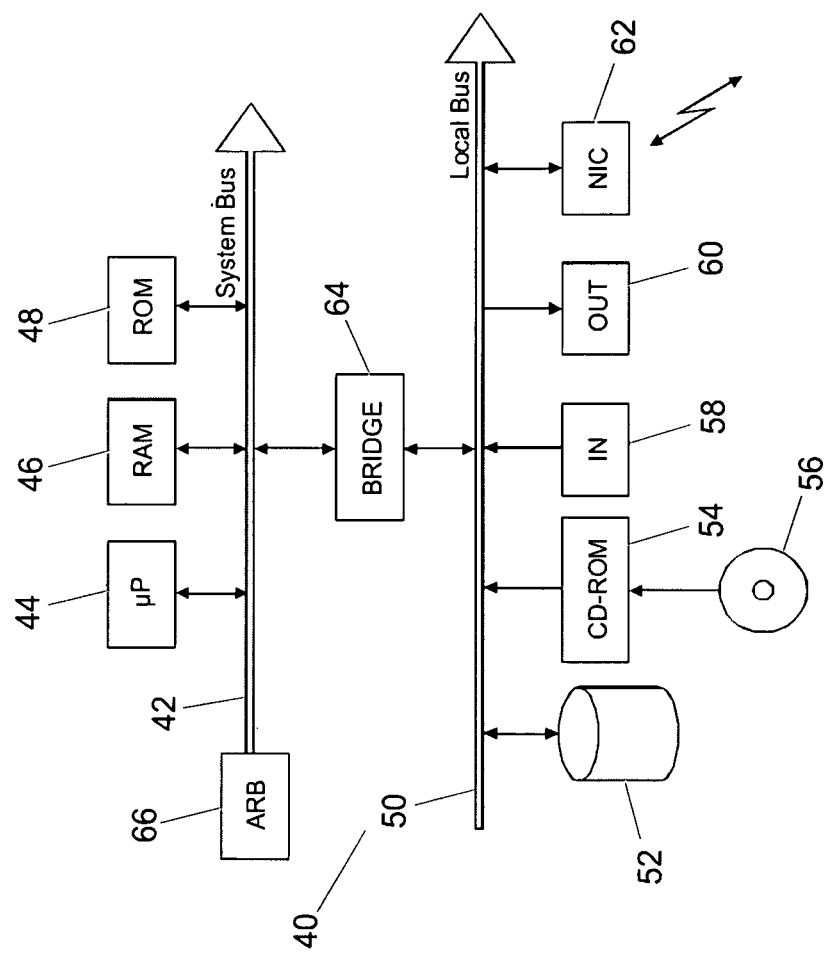
FIG. 3 is a high-level block diagram of one embodiment of a computer system for implementing a method in accordance with the invention.

A computer system 40, or apparatus 40, for implementing a method in accordance with the invention may include a structure like that shown in FIG. 3. The computer system 40 may include several units that are connected in parallel to a system bus 42. One or more microprocessors 44 may control the operation of the computer system 40. A RAM 46 may be used as a working memory by the microprocessor(s) 44. A ROM 48 may store basic code for booting the computer 40. Peripheral units may be clustered around a local bus 50 and communicate by means of respective interfaces.

In selected embodiments, mass memory may include a hard disk 52 and/or a drive 54 for reading storage media, such as a CD-ROM 56. The computer 40 may also include input devices 58 (e.g., a keyboard, mouse, etc.) and output devices 60 (e.g., a monitor, printer, etc.). A network interface card (NIC) 62 may be used to connect the computer 40 to a network, such as a LAN, WAN, or the Internet. A bridge unit 64 may provide an interface between the system bus 42 and the local bus 50. The microprocessor(s) 44 and the bridge unit 64 may operate as master agents in requesting access to the system bus 42. An arbiter 66 may manage grants of access with mutual exclusion to the system bus 42.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for dynamically recalculating a critical path in a job scheduling system, the method comprising:
   determining that a first job in the critical path has completed;
   identifying a successor job of the first job, wherein an initiation of the successor job is dependent on the completion of the first job;
   identifying a predecessor job of the successor job, wherein the predecessor job is not the first job, and the initiation of the successor job is dependent on the completion of the predecessor job;
   in the event the predecessor job has not completed, dynamically recalculating the critical path such that the recalculated critical path does not include the first job, wherein dynamically recalculating the critical path comprises ensuring a correct order of prioritization for jobs in the recalculated critical path; and
   leaving the critical path unchanged in the event the predecessor job, as well as any other predecessor jobs of the successor job, have completed.

2. The method of claim 1, wherein recalculating the critical path comprises
   employing a conventional critical path determination algorithm.

3. The method of claim 2, wherein employing the conventional critical path determination algorithm comprises
   employing the conventional critical path determination algorithm starting from an earliest non-completed predecessor job.

4. A computer program product for dynamically recalculating a critical path in a job scheduling system, the computer program product comprising a non-transitory computer-readable storage medium having computer-usable program code embodied therein, the computer-usable program code comprising:
   computer-usable program code for determining that a first job in the critical path has completed;
   computer-usable program code for identifying a successor job of the first job, wherein an initiation of the successor job is dependent on the completion of the first job;
   computer-usable program code for identifying a predecessor job of the successor job, wherein the predecessor job is not the first job, and the initiation of the successor job is dependent on the completion of the predecessor job;
   computer-usable program code for, in the event the predecessor job has not completed, dynamically recalculating the critical path such that the recalculated critical path does not include the first job, wherein dynamically recalculating the critical path comprises ensuring a correct order of prioritization for jobs in the recalculated critical path; and
   computer-usable program code for leaving the critical path unchanged in the event the predecessor job, as well as any other predecessor jobs of the successor job, have completed.

5. The computer program product of claim 4, further comprising computer-usable program code for recalculating the critical path by employing a conventional critical path determination algorithm.

6. The computer program product of claim 5, further comprising computer-usable program code for employing the conventional critical path determination algorithm starting at an earliest non-completed predecessor job.

7. An apparatus for dynamically recalculating a critical path in a job scheduling system, the apparatus comprising:
   at least one processor;
   at least one memory device coupled to the at least one processor and storing modules for execution on the at least one processor, the modules comprising:
      a determination module to determine that a first job in the critical path has completed;
      an identification module to identify a successor job of the first job, wherein an initiation of the successor job is dependent on the completion of the first job;
      an identification module to identify a predecessor job of the successor job, wherein the predecessor job is not the first job, and the initiation of the successor job is dependent on the completion of the predecessor job; and
      a recalculation module to, in the event the predecessor job has not completed, dynamically recalculate the critical path such that the recalculated critical path does not include the first job, wherein dynamically recalculating the critical path comprises ensuring a correct order of prioritization for jobs in the recalculated critical path, and leave the critical path unchanged in the event the predecessor job, as well as any other predecessor jobs of the successor job, have completed.

8. The apparatus of claim 7, wherein the recalculation module is further configured to employ a conventional critical path determination algorithm to recalculate the critical path.

9. The apparatus of claim 8, wherein the recalculation module is further configured to employ the conventional critical path determination algorithm starting at an earliest non-completed predecessor job.

* * * * *